United States Patent [19]
Plumb

[11] Patent Number: 5,453,187
[45] Date of Patent: Sep. 26, 1995

[54] FOOD, OIL AND GREASE ACCUMULATION APPARATUS AND METHOD

[76] Inventor: Arnold D. Plumb, 6918 E. 63rd St., Tulsa, Okla. 74133

[21] Appl. No.: 196,429

[22] Filed: Feb. 15, 1994

[51] Int. Cl.$^6$ .......................... C02F 9/00; B01D 17/028; B01D 36/00; B01D 35/31
[52] U.S. Cl. ..................... 210/202; 210/198.1; 210/236; 210/238; 210/241; 210/259; 210/295; 210/314; 210/335; 210/519; 210/522; 210/708; 210/799; 210/DIG. 5; 210/188; 422/5; 422/120; 422/122; 417/313
[58] Field of Search ............................... 210/109, 198.1, 210/236, 238, 241, 251, 258, 259, 295, 314, 521, 522, 456, 502.1, DIG. 5, 708, 799, 669, 693, 202, 188, 205, 206, 335, 519; 422/5, 120, 122; 417/313

[56] References Cited

U.S. PATENT DOCUMENTS

| | | |
|---|---|---|
| 3,847,813 | 12/1974 | Castelli . |
| 3,878,094 | 4/1975 | Conley . |
| 3,957,656 | 5/1976 | Castelli . |
| 3,992,297 | 11/1976 | Baugheom . |
| 4,113,617 | 9/1978 | Bereskin . |
| 4,139,463 | 2/1979 | Murphy . |
| 4,162,973 | 7/1979 | Lynch . |
| 4,194,976 | 3/1980 | Robinsky . |
| 4,224,157 | 9/1980 | Jain . |
| 4,238,333 | 12/1980 | Tidwell . |
| 4,240,908 | 12/1980 | Swain . |
| 4,268,396 | 5/1981 | Lowe . |
| 4,278,545 | 7/1981 | Batutis et al. . |
| 4,299,706 | 11/1981 | Smith . |
| 4,308,136 | 12/1981 | Warne . |
| 4,361,488 | 11/1982 | White . |
| 4,405,459 | 9/1983 | Smith . |
| 4,427,551 | 1/1984 | Duveau . |
| 4,678,571 | 7/1987 | Hosaka . |
| 4,798,677 | 1/1989 | Irwin . |
| 5,030,357 | 7/1991 | Lowe . |
| 5,039,407 | 8/1991 | Mohrman . |
| 5,068,035 | 11/1991 | Mohr . |
| 5,167,829 | 12/1992 | Diamond . |
| 5,178,754 | 1/1993 | Batten et al. . |
| 5,207,922 | 5/1993 | McFarlan . |
| 5,227,071 | 7/1993 | Torline . |
| 5,236,585 | 8/1993 | Fink . |
| 5,254,267 | 10/1993 | Deskins . |
| 5,269,939 | 12/1993 | Laurent . |
| 5,330,636 | 7/1994 | Reichert . |
| 5,350,527 | 9/1994 | Kitko . |
| 5,374,358 | 12/1994 | Kaniecki . |

FOREIGN PATENT DOCUMENTS

| | | |
|---|---|---|
| 3440506 | 5/1986 | Germany . |
| 3630677 | 3/1988 | Germany . |
| 4100823 | 7/1992 | Germany . |
| 2217621 | 1/1989 | United Kingdom . |

*Primary Examiner*—Thomas M. Lithgow
*Attorney, Agent, or Firm*—Pravel, Hewitt, Kimball & Krieger

[57] ABSTRACT

An improved food, oil and grease accumulating apparatus and method of use is disclosed. The improved apparatus includes a pump station to discharge contaminated effluent at a higher flow rate at periodic intervals into a first food separation station for removing food particles. Effluent leaves the food separation station into a second food separation system and then an oil and grease separation station which uses an oleophillic material to attract and coalesce oil and grease particles and permit their advancement along channels to the top region of the oil and grease separation station. The oil and grease are removed through an evacuation system while the water is permitted to discharge from the oil and grease separation station into the sewer system.

14 Claims, 6 Drawing Sheets

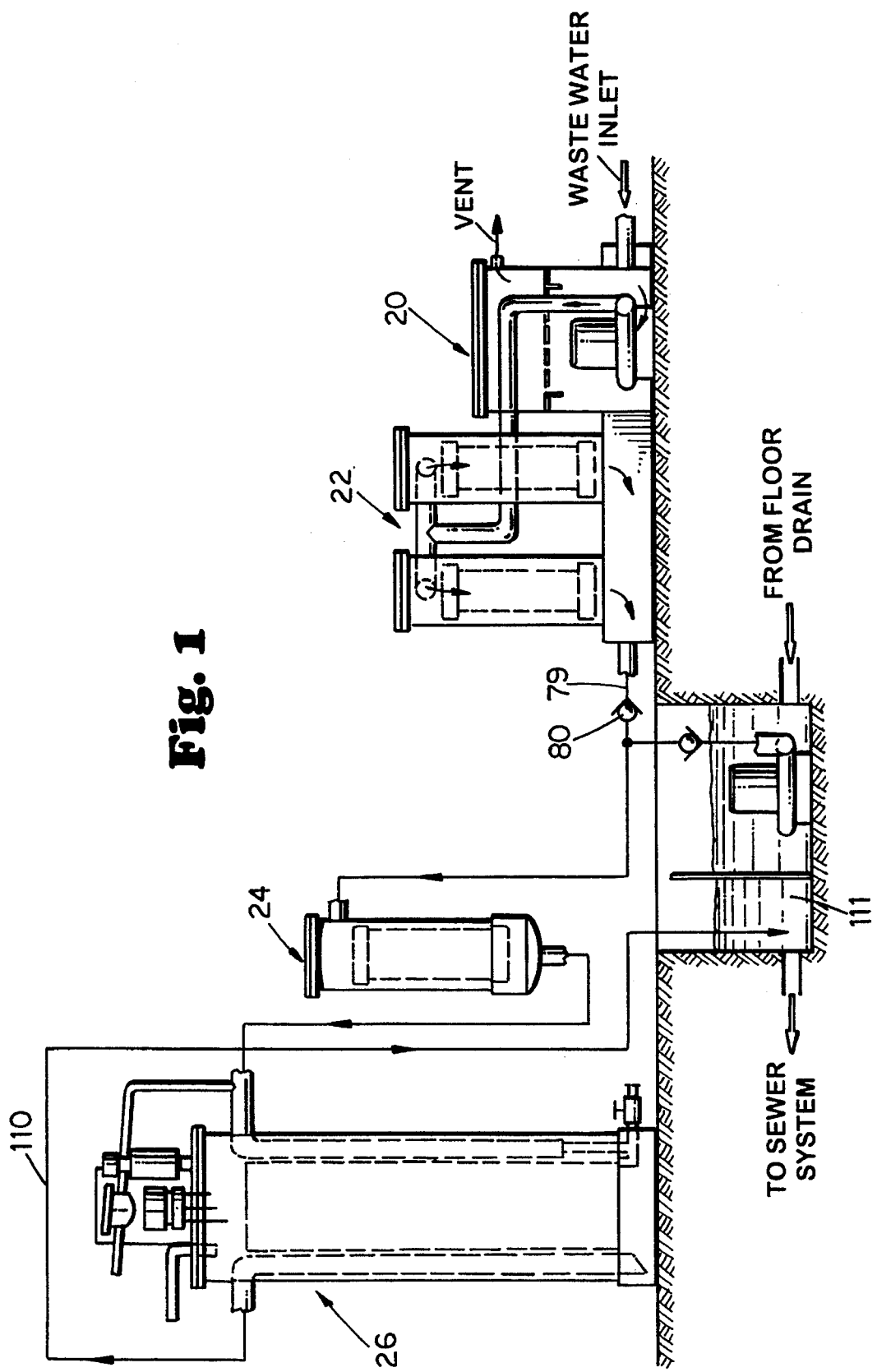

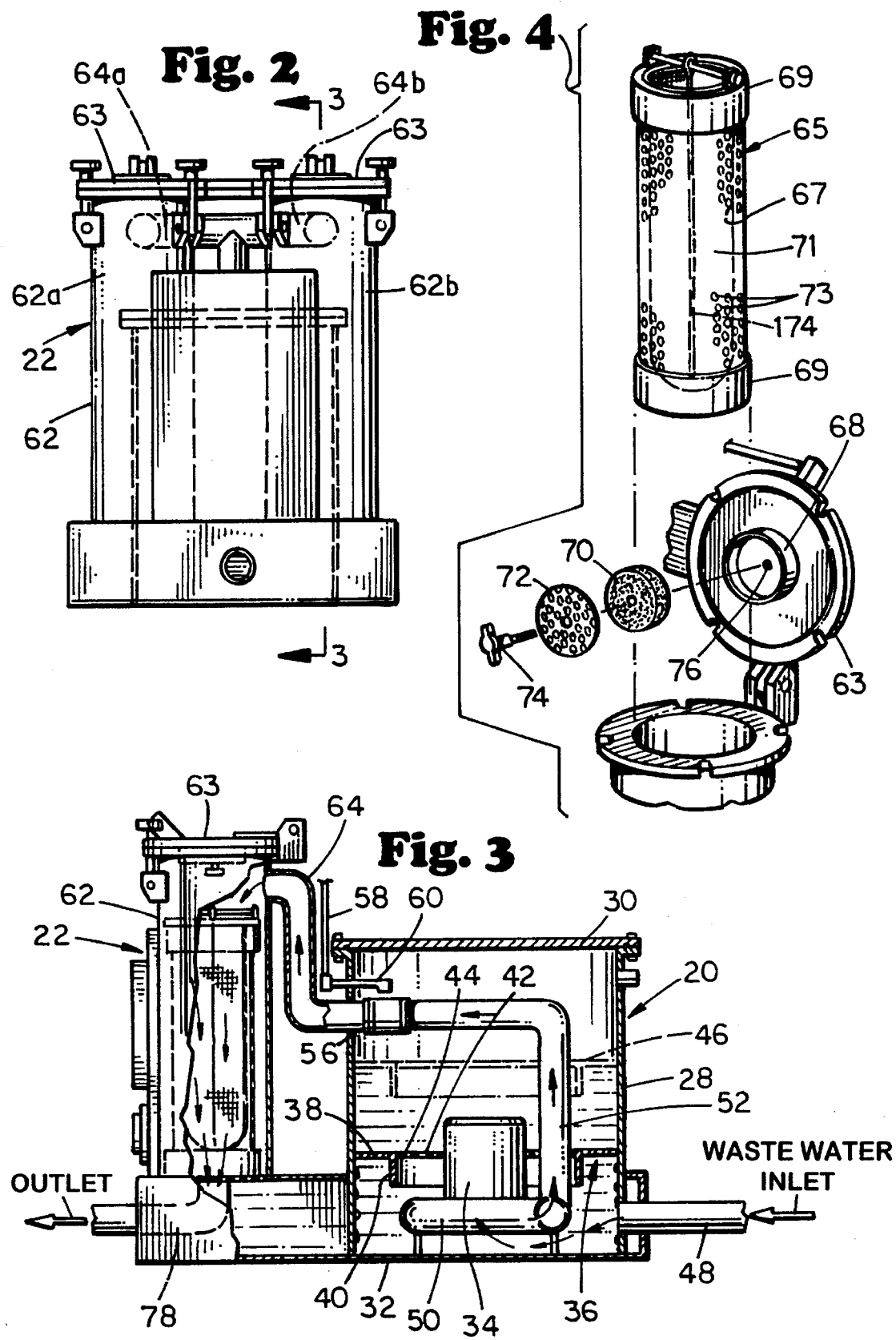

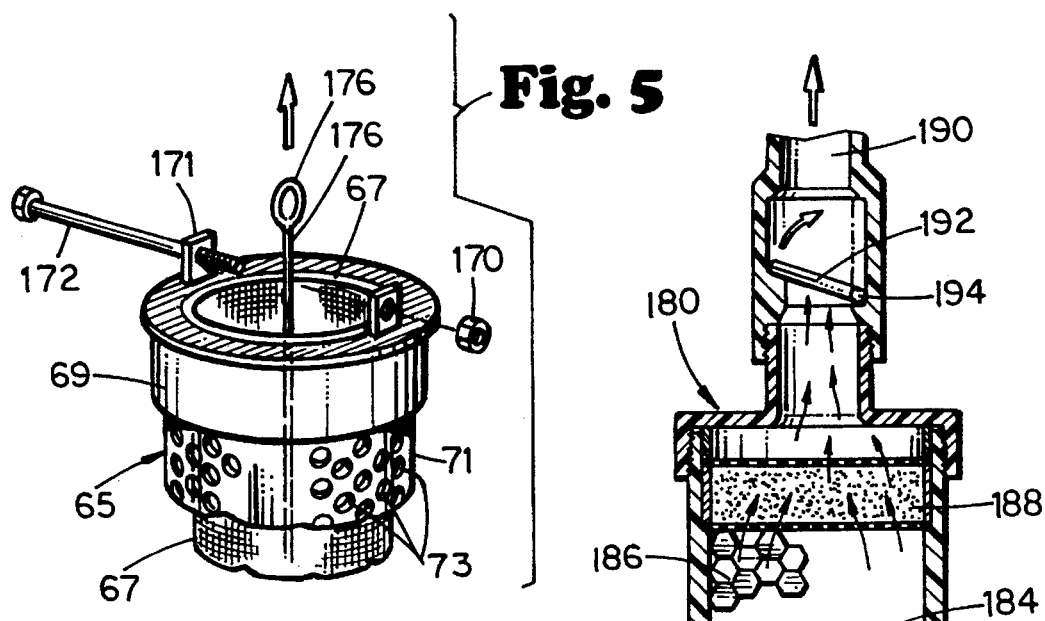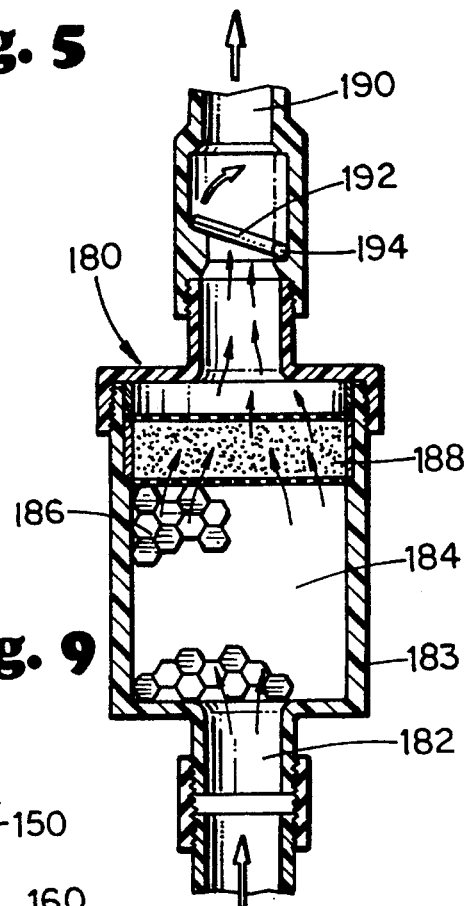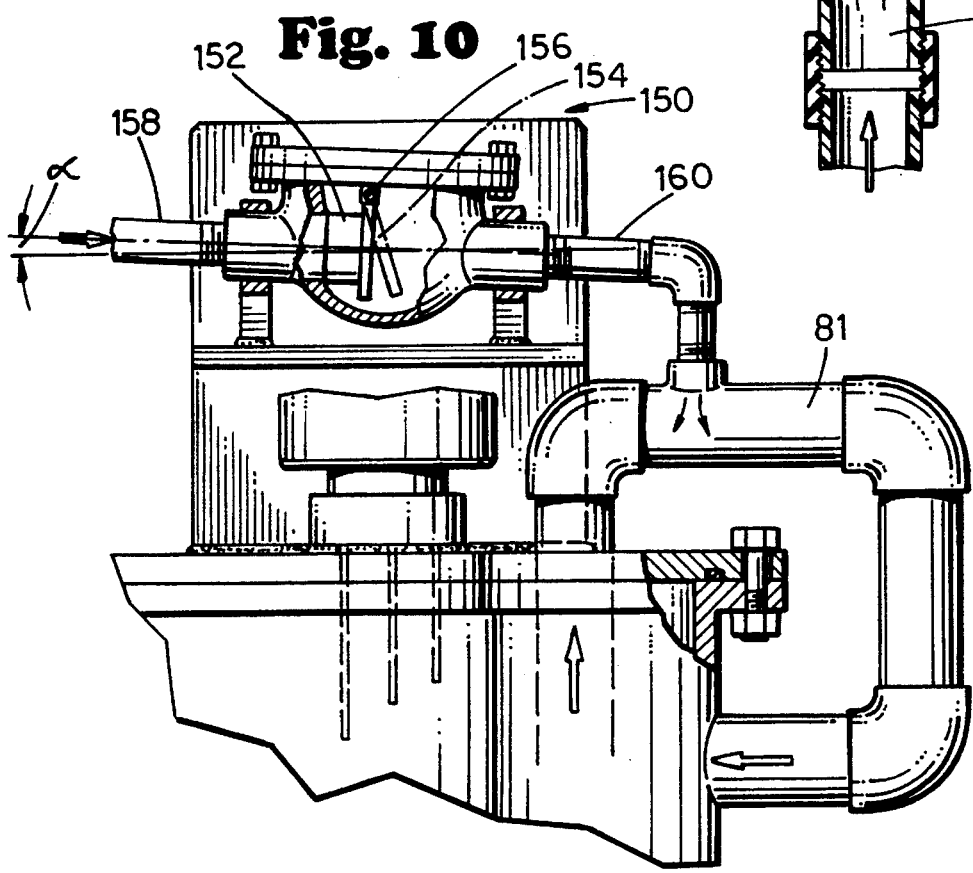

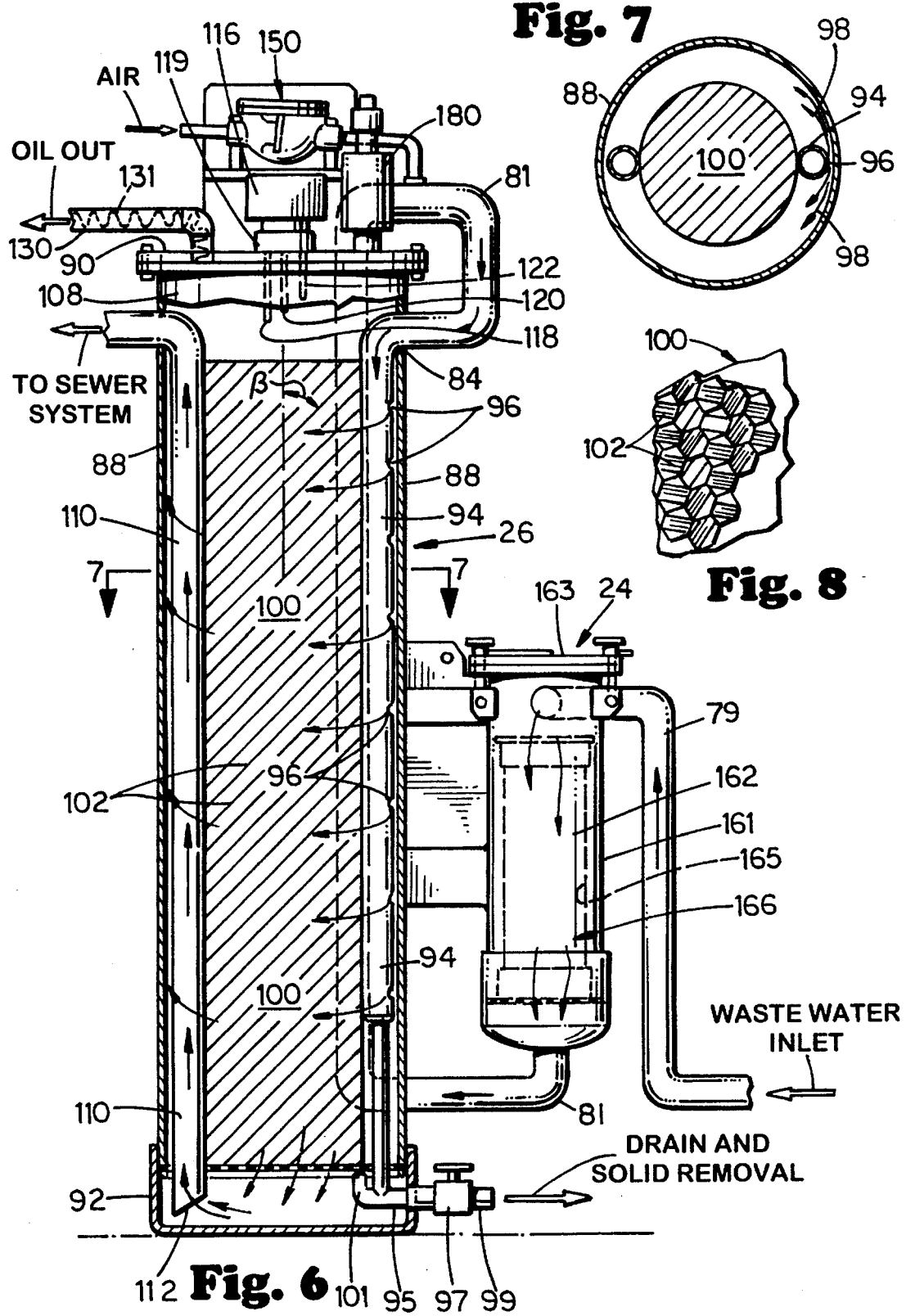

FOOD, OIL AND GREASE ACCUMULATION APPARATUS AND METHOD

BACKGROUND OF THE INVENTION

1. Field of the Invention

The present invention relates to an improved apparatus and method for removing contaminants from an effluent stream. More particularly, the present invention relates to an improved apparatus and method for removing food, oil and grease from the waste water discharge system of a restaurant or other food service establishment.

2. Description of the Prior Art

As a result of recent environmental regulations, restaurants and food service establishments must begin to remove food, oil and grease from the effluent or discharge streams of the kitchen and other food preparation areas before discharging into the sewer system of the municipality. Additionally, many local ordinances prohibit the discharge of food from a restaurant establishment or other food preparation establishment directly into the sewer system through a grease interceptor.

Accordingly, there is a need for an improved apparatus and process for sequentially removing food and then oil and grease in discharge waste water from a restaurant or other food service food establishment.

The prior art includes disclosure of various types of oil and/or grease accumulators. See for example, Fink, U.S. Pat. No. 5,236,585; Lowe, U.S. Pat. No. 4,268,396; Batten, et al., U.S. Pat. No. 5,178,754; Robinsky, U.S. Pat. No. 4,194,796; Lowe, U.S. Pat. No. 5,030,357; and Smith, U.S. Pat. No. 4,299,706.

However, these references, as well as other known techniques in the industry do not provide an efficient and effective system for sequentially removing food particles and then oil and grease in compliance with environmental requirements.

SUMMARY OF THE INVENTION

The apparatus of the present invention is an improved food, oil and grease accumulation system which includes a pump station that receives the contaminated stream from the kitchen or food preparation area. The pump station includes a pump supported within a housing which is activated after the contaminated water reaches a predetermined level in the housing and discharges the effluent at a high flow rate into a food separation station.

The food separation station includes a housing having at least one chamber and at least one removable filter for removing food particles. The contaminated stream then exits the food separation station and enters an oil and gas separation station having an elongated vertical housing and an injection member for introducing the contaminated stream into the vertical housing along the height of the vertical housing at a substantially uniform rate.

An oleophillic material is supported within the housing having channels at an acute angle to the longitudinal axis of the vertical housing whereby oil and grease particles are permitted to coalesce and rise to the top of the vertical housing. Water being strained through the oleophillic material migrates towards the bottom of the housing where it is discharged into the sewer system.

In the event the food establishment is a fast-food restaurant which does not require the removal of substantial food particles rather primarily only the separation of oil and grease from the decontaminated stream, generally it is only necessary to include a preliminary food station separator followed by an oil and grease separation station as discussed above. The preliminary food station would be a smaller version of the primary one discussed above.

With respect to the method of the present invention, the process includes periodically activating a pump to discharge a decontaminated stream from the kitchen or food preparation area, introducing the decontaminated stream into a food separation station, removing the food particles, discharging the decontaminated stream from the food separation station and introducing it into an oil and grease separation station, removing the oil and grease from the decontaminated stream, discharging the water from the oil and grease separation station, and periodically evacuating the oil and grease from the top of the separator.

The foregoing description is intended to be a summary only. Specific details of the present invention would be described more fully in the detailed description which follows and in the claims appended hereto.

BRIEF DESCRIPTION OF THE DRAWINGS

In order to more fully understand the drawings referred to in the detailed description of the present invention, a brief description of each drawing is provided.

FIG. 1 is an elevation view of the present invention.

FIG. 2 is an elevation end view of the food separation station of the present invention.

FIG. 3 is a cross-section view of the food separation station of the present invention taken along line 3—3 of FIG. 2.

FIG. 4 is a detail of a portion of the food separation station of the present invention.

FIG. 5 is another detail of a portion of the food separation station of the present invention.

FIG. 6 is an elevation view, partly in section, of the oil and grease separation station with an accompanying food separation station of the present invention.

FIG. 7 is a cross-section view taken along line 7—7 of FIG. 6.

FIG. 8 is a detailed cross-sectional view, in elevation, of the oleophillic material located within the oil and grease separation station of the present invention.

FIG. 9 is a detail view, in cross-section, of an air surge protector located at the top of the oil and grease separation station of the present invention.

FIG. 10 is a detail view of an anti-siphoning feature located at the top of the oil and grease separation station of the present invention.

DETAILED DESCRIPTION OF PREFERRED EMBODIMENT

Figure 11:
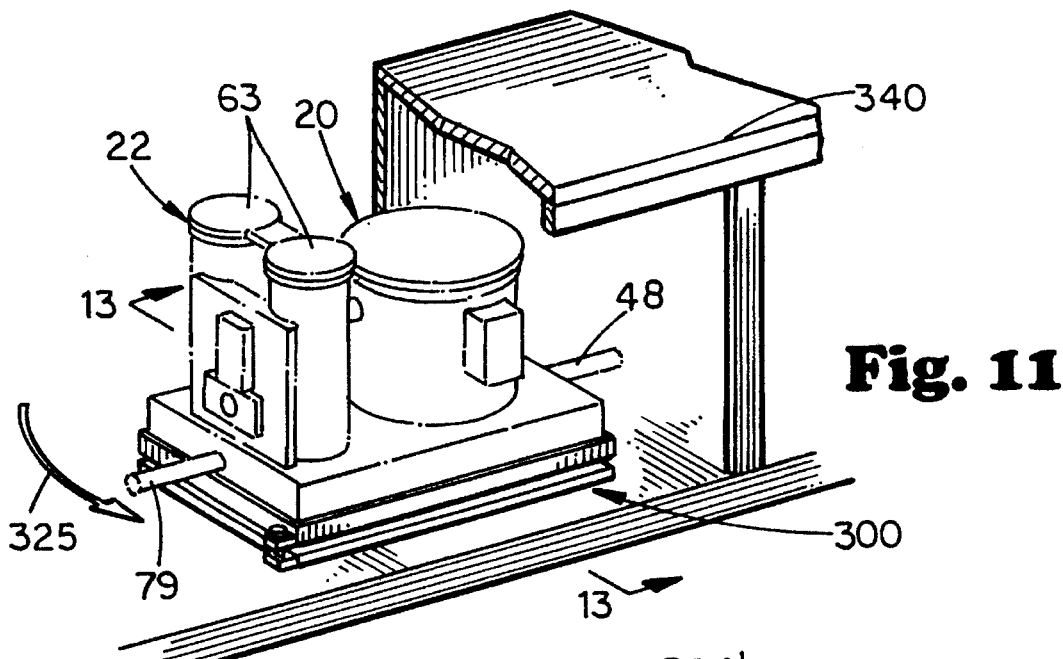
FIG. 11 is an isometric view of the food separation station supported on a rotatable tray assembly of the present invention.

Referring to FIG. 1 of the present invention, the improved food, oil and grease accumulation system includes a pump station 20, a primary food separation station 22, an optional or secondary food separation station 24, and an oil and grease separation station 26.

Referring now to FIGS. 1–3, the pump station 20 includes an outer housing 28, a top flange 30 attached to housing 28 and a bottom plate 32. A centrifugal pump 34 is supported on plate 32 within the housing 28. A baffle 36 floats at the water surface within housing 28. Baffle 36 includes an annular perimeter portion 38 having a downwardly projecting leg 40. A center portion 42 is supported by annular portion 38 and includes a plurality of apertures 44. Food baffle 36 floats at the waterline surface within housing 28 and serves to keep food from adhering to the side walls of the interior of housing 28 as the water level rises and falls. Baffle 36 also serves to keep food particles submerged so that pump 34 can remove all food particles with the waste water when it is pumped out as disclosed herein. Phantom lines 46 show an alternate location of baffle 36, for example, as it floats with the waterline. Pump 34 is an off-the-shelf pump such as that manufactured by Hydromatic Corporation, Model D25 A1. This pump includes limit switches which are part of the purchased unit and are used to periodically activate the pump. Since waste water entering housing 28 would not flow in at a steady rate, housing 28 is used to collect the water until it reaches a predetermined level and the limit switches activate pump 34. Pump station 20 includes an inlet 48 through which waste water enters from the kitchen or other food preparation area. This waste water includes food particles and oil and grease which are removed by the present invention.

Conduit 50 is part of pump 34 and forms a circumferential power train of pump 34. Conduit 52 is attached to conduit 50 and exits the housing at outlet 56. When the pump 34 is activated it pumps liquid saturated with food particles through conduit 50 and out conduit 52, thereby lowering the waterline and baffle 36.

In this manner, pump station 20 may be used as a holding reservoir for retaining contaminated waste water until pump 34 is periodically activated. This maximizes the efficiency of the system by minimizing the number of times pump 34 is operated. The food baffle 36 serves to keep all food particles submerged and off the interior of the housing 28 and the conduit 52. Pump station 20 includes a water inlet 58 having a nozzle 60 which is used to periodically inject water into the interior of the housing and wash any food particles which have attached to the sidewalls of housing 28 down into the lower region of the housing for subsequent discharge by the action of pump 34.

Referring now to FIGS. 2–5, the structure of the food separation station 22 will be described. The food separation station 22 is comprised of a housing 62 having pivotal tops 63. As shown in FIG. 2, the housing 62 includes two chambers 62a and 62b. Two chambers are preferable in order to accommodate the high flow rate of contaminated waste water entering the food processing station; however, it will be understood that any number of chambers may be used depending upon the needs of the operator. Each chamber 62a/62b includes its own top 63. As shown, conduit 64, which exits through outlet 56 of pump station 20, is bifurcated in the case of the embodiment shown in FIG. 2 into two outlets 64a and 64b. Each outlet enters one of the chambers 62a/62b. Since it is desirable to activate pump 34 only periodically (to minimize power usage) and since these centrifugal pumps are designed to operate at a substantial flow rate (on the order of approximately 20 gallons per minute), breaking the contaminated stream into two streams will reduce the flow rate into each chamber to approximately ten gallons per minute. This is preferable to control the rate at which the amount of food particles are removed.

Referring now to FIGS. 4 and 5, a filter canister 65 is positioned within each chamber 62a/62b. The filter canister 65 is made of top and bottom rings 69 and hollow cylinder 71 with multiple apertures 73. A filter 67 seats within canister 71. Filter 67 includes a top ring 75 and mesh material 77 (see FIG. 14). The filter 67 is held down in canister 65 by bolt 172/nut 170 which pass through eyelets 171 attached to ring 69. A string 174 with ring 176 is attached to the bottom of mesh material 77 and is used to clean out the filter 67 as described later. Mesh material 77 serves to capture all food particles above a specified limit. Preferably, material 77 is a 25–40 mesh filter size. This size will capture substantially all food particles and allow the water laden with oil and grease to pass through.

Referring still to FIG. 4, the top 63 includes a circular rim 68 which laterally supports a deodorizer bar 70. Deodorizer bar 70 is held within rim 68 by a perforated plate 72. Screw handle 74 passes through an aperture at the center of perforated plate 72 and deodorizer 70 and threadably engages aperture 76 within the center of top 63. In this manner, the deodorizer may be secured within top 63 to help eliminate any stringent food odor which will develop until filter 73 is periodically cleaned.

Returning now to FIG. 3, the contaminated stream will exit at the bottom of each chamber 62 through an outlet 78. All outlets 78 will merge into a conduit 79 pass through a check valve 80 (see FIG. 1) and enter into the top of a secondary food separation station 24 (see FIG. 6). Check valve 80 serves to prohibit the flowback of any fluids upstream when pump 34 is periodically deactivated.

Referring now to FIGS. 6–8, the oil and grease separation station 26 with accompanying secondary food separation station 24 is shown. As will be described below, the alternate embodiment of the present invention does not include pump station 20 or primary food separation station 22. The alternate embodiment is recommended primarily for fast-food restaurants which use disposable plates and do not have a large amount of discharged food passing through the waste water stream. However, what food does pass through the waste water stream is removed with food separation system 24, generally smaller in capacity than food separation station 22.

Referring still to FIG. 6 for purposes of the preferred embodiment, discharged waste water from food separation station 20 is advanced to the top of secondary food separator 24. As in the case of chambers 63a/63b, secondary food separation station 24 includes a housing 161 having a pivotal top 163. Housing 161 defines a chamber 162 which houses a filter canister 166, basically identical to canister 65 of FIG. 4. While not shown, top 163 includes a deodorizer system 72/70/76 as shown in FIG. 4. Canister 166 retains a filter 165 identical to filter 67. Secondary food station 24 serves as a backup system to remove any additional food particles which may pass through food separation station 20. Again, water laden with oil and grease will pass into the discharge outlet 81 and advance toward the top of the oil and grease separation station 26. Referring still to FIG. 6, conduit 81 rises at the rear of the oil and grease separation station 26 as shown by the phantom lines and enters station 26 near the top end at inlet 84. The oil and grease separation station 26 comprises an elongated vertical housing 88 having a top flange 90 which is attached to housing 88. Station 26 includes a base 92. The contaminated stream enters inlet 84 and advances into an injection member 94. Injection member 94 is the height of vertical housing 88 and includes a plurality of apertures 96 which are strategically positioned along the length of member 94. The vertical distance between each aperture 96 and the diameter of each aperture 96 is selected to ensure a uniform release of the contaminated stream along the length of member 94. Preferably, apertures 96 are staggered approximately nine inches apart and vary uniformly in diameter from about ⅜ inch at the top of member 94 to about ⅞ inch at the bottom of member 94. As shown in FIG. 7, apertures 96 face the interior surface of housing 88 to uniformly distribute fluid in both directions as shown by arrows 98. Injection member 94 terminates into a T-connection 95 which permits drainage through a valve 97 and conduit 99. Normally, valve 97 is in a closed position. However, if it becomes necessary to drain station 26, an operator may open valve 97 when the system is turned off thereby draining station 26 through conduit 101 which is in fluid communication with the interior of housing 88.

Positioned within housing 88 is an oleophillic material 100 having a plurality of channels 102 arranged at an acute angle β with respect to the longitudinal axis of housing 88. Such oleophillic material is available through Bentwood Company and is referred to as a PVC fill product, Model No. CF1200.010. As manufactured, oleophillic material includes channels 102. The proper positioning of oleophillic material 100 within chamber 88 will ensure that channels 102 are positioned at an acute angle to the longitudinal axis of chamber 88. As seen in FIG. 8, oleophillic material 100 includes a series of channels 102 which are basically honeycombed in shape.

Oleophillic material 100 serves to attract oil and grease, acting as a sorbent. The individual particles of oil and grease gradually rise as flow of the waste water advances in channels 102, striking the oleophillic material and adhering to it. The oil and grease particles gradually migrate upwardly along channels 102 further coalescing as they advance and rising to the top of the housing 88 as they reach the end of each channel. In this manner, coalesced oil and grease converges at the top of the housing 88 in region 108. The water, being substantially oil/grease free, moves down the channels 102 and is permitted to exit the housing 88 through a discharge conduit 110 having an opening 112 at the bottom of the housing 88. In this manner, only water which has been permitted to encounter oleophillic material 100 is removed from the system. From conduit 110, the discharged effluent is discharged into floor basin 111 which exits directly into the sewer system for the municipality.

The oil and grease separation station 26 includes a three-probe monitoring system 116. Such a probe system is manufactured by API Industries of Tulsa, Okla. and operates in the following manner. Three probes, 118, 120 and 122 extend from the monitoring housing 119 through top flange 90 into the oil/water interface within region 108. Probe 118 acts as the common lead and is long enough to be always in contact with the interface. Probe 120 is shorter than probe 118, and probe 122 is shorter than probe 120. When the oil/water interface reaches probe 120 it is in contact with both probe 118 and 120 and establishes a contact which activates a pump (not shown) to suction off oil and grease through a conduit 130. As the suctioning continues, the oil/water interface rises until it contacts probe 122. At that point, electrical contact is made across probe 122 and common probe 118 shuts off the pump which is suctioning off the oil and grease thereby terminating the suctioning operation. When the interface reaches the tip of probe 120, the suction pump is reactivated and the process repeats itself.

Referring still to FIG. 6, conduit 130 may be wrapped with a heat tracer cable 131 which keeps the temperature of conduit 130 and all oil and grease being removed therein from freezing and coalescing. Heat tracer cable 131 operates off a standard 115 volt circuit and is available from Nelson Electric company of Tulsa, Okla.

Referring now to FIG. 10, the present invention also includes an anti-siphoning mechanism 150 which is preferably located at the top of the separation station 26. The anti-siphoning mechanism 150 includes a one-way check valve 152 having a flapper 154 pivotal at pin 156. The valve 152 is positioned at an angle α of approximately between 1°–2°. Valve 152 has one conduit 158 which is open to the atmosphere and a second conduit 160 which is in fluid communication with conduit 81 that extends from the second food separation station 24 into the top of housing 88. The anti-siphon mechanism 150 serves to prevent the backflow of contaminated fluid through the previously mentioned facilities when pump 34 is not operating. As noted above, pump 34 only operates under preselected conditions based on the level of the contaminated stream within housing 28. When pump 34 is not operational there may be a tendency for fluid to siphon out of the oil and grease separation station 26. Such anti-siphoning action, however, can be quickly broken by the introduction of air into the system. Upon the slightest indication of a siphoning action, flapper 154 pivots permitting the introduction of air from through conduit 158 into conduit 81 which automatically terminates any siphoning action. During a normal operating mode, the contaminated stream is not permitted to exit conduit 158 since flapper valve 154 is firmly seated against conduit 158. It is understood that pump 34 only provides higher flow rate periodically based on its activation triggered by the limit switches discussed above. Only when pump 34 is in operation are the food separation stations 22/24 and the oil and grease separation station 26 operational. Otherwise, the system is inactive between pumping operations except for passive migration of the oil and grease through the oleophillic material 100 of separation station 26.

Figure 12:
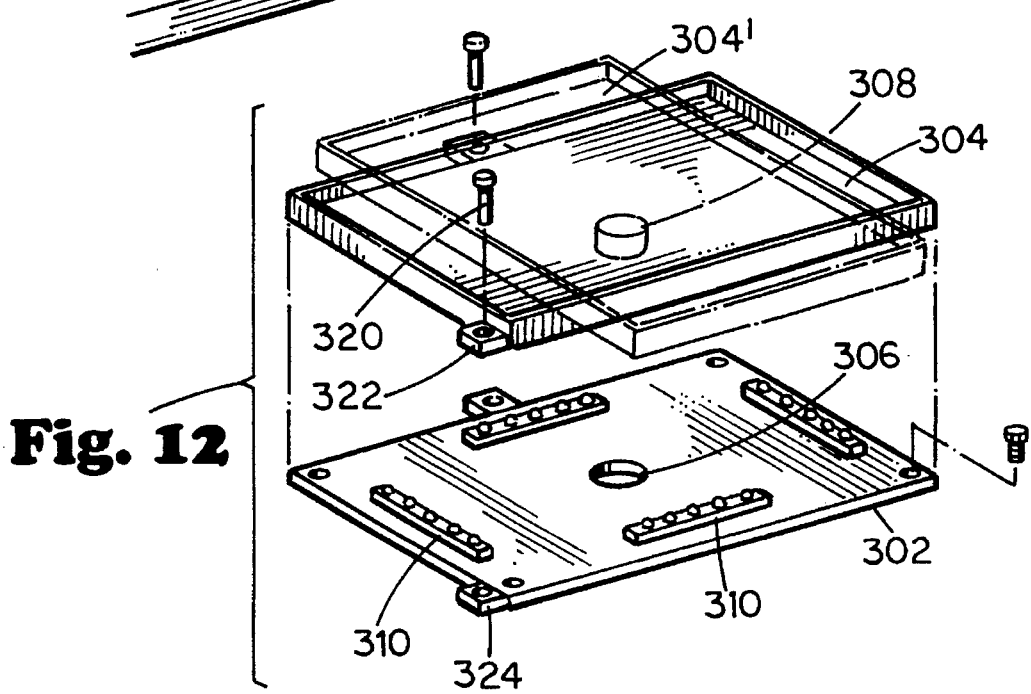
FIG. 12 is an perspective view of the rotating tray assembly in a partially disassembled state.
Figure 13:
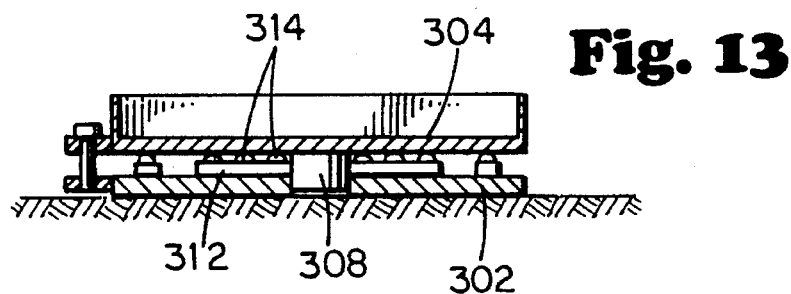
FIG. 13 is a cross-sectional view of the rotatable tray assembly taken along line 13—13 of FIG. 11.

Reference is now made to FIGS. 11–13 which disclose a tray assembly 300 on which pump station 20/first food separation station 22 are supported. Tray assembly 300 serves to permit the rotation of such units 20/22 from underneath a counter to enable the operator to easily clean filters 67. The tray assembly comprises a bottom plate 302 and a top plate 304. Bottom plate 302 includes an aperture 306 through which a post 308, attached to plate 304 may rotate. Ways 310 are attached to plate 302. Each way 310 includes a base assembly 312 with bearings 314 supported therein. Ways 310 are positioned preferably on each side of plate 302. In this manner, plate 304 may be easily rotated relative to plate 302, their relative rotation being fixed by post 308.

In a normal operating mode, pin 320 passes through eyelets 322 and 324 as shown in FIG. 12. However, when it becomes necessary to rotate the pump station/first food separation station in the direction of arrow 325 as shown in FIG. 11, quick disconnects are first disconnected from conduits 79 and 48 (disconnects not shown). Such disconnects may be those manufactured by Nibco Company, Model No. 1.5"/2" Quick Disconnects. Alternately, conduits 79 and 48 may include a couple of feet of extra length which provides enough slack to pivot the equipment without having to disconnect the lines. When it is time to rotate the equipment as disclosed herein, pin 320 is pulled and plate 304 is rotated to the position shown by phantom lines 304' of FIG. 12. In this orientation, tops 63 of first food separation station 22 have cleared the edge of table top 340. Tops 63 may be easily removed and the filter canisters 65 removed for cleaning without interference.

Figure 14:
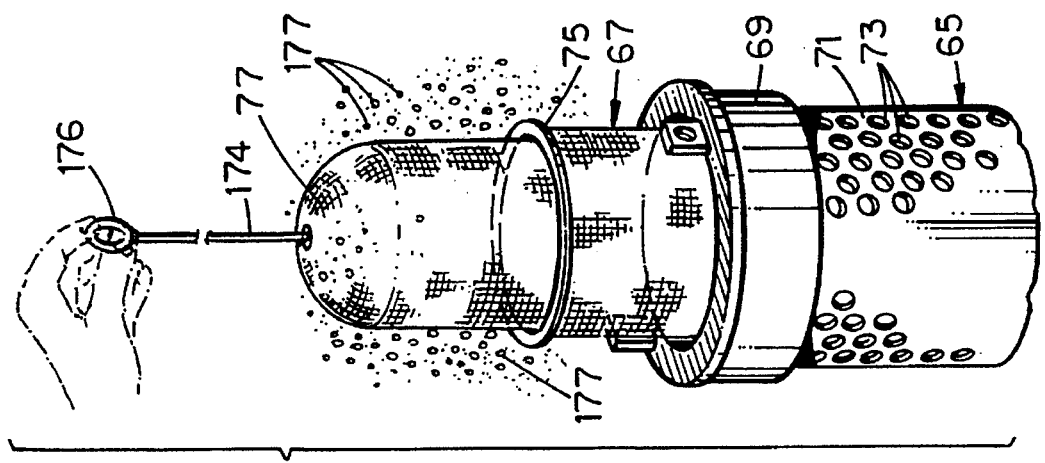
FIG. 14 is a perspective detail view of the removable filter as shown in FIGS. 4 and 5 of the present invention.

Referring now to FIGS. 5 and 14, filter canister 65 is shown being disassembled for cleaning purposes. As discussed previously, filter 65 supports filter 67. To clean filter 67, first canister 65 is manually removed. Nut 170 is removed from bolt 172. Normally, bolt 172 passes through eyelet 176. Once bolt 172 is removed, eyelet 176 is pulled which begins to invert mesh material 77 as shown in FIG. 14 and food particles 177 may be disposed of and material 77 may then be rinsed clean along with canister 65. The filter 67 may then be reinserted back into canister 65 for placement within chamber 62.

Referring now to FIG. 9, an air surge protector mechanism 180 is shown. Such a mechanism is required to remove air and prevent agitation due to the periodic activation of pump 34. Air surge protector mechanism 180 is attached to top flange 90. Surge air pressure which may result, such as by activation of pump 34, is permitted to enter a conduit 182 in fluid communication with the interior of housing 88 and pass into a chamber 184 defined by housing canister 183. Mechanism 180 includes oleophillic material 186 located within chamber 184. Such oleophillic material may be similar to oleophillic material 100 used in separation station 26. A finer mesh or filter 188 is located above oleophillic material 186 and serves to filter out food debris and other particles. The height of chamber 184 is selected so as to prevent the expulsion of any fluid past exit conduit 190. Preferably, chamber 184 is about 2 inches in diameter and about 24 inches high to prevent expulsion of any liquid. Air surge mechanism 180 includes a pivot plate 192 hinged at pin 194 to prevent the introduction of any fluid into the air surge mechanism via that portion of conduit 190 exposed to the atmosphere.

DETAILED DESCRIPTION OF THE ALTERNATE EMBODIMENT

Figure 15:
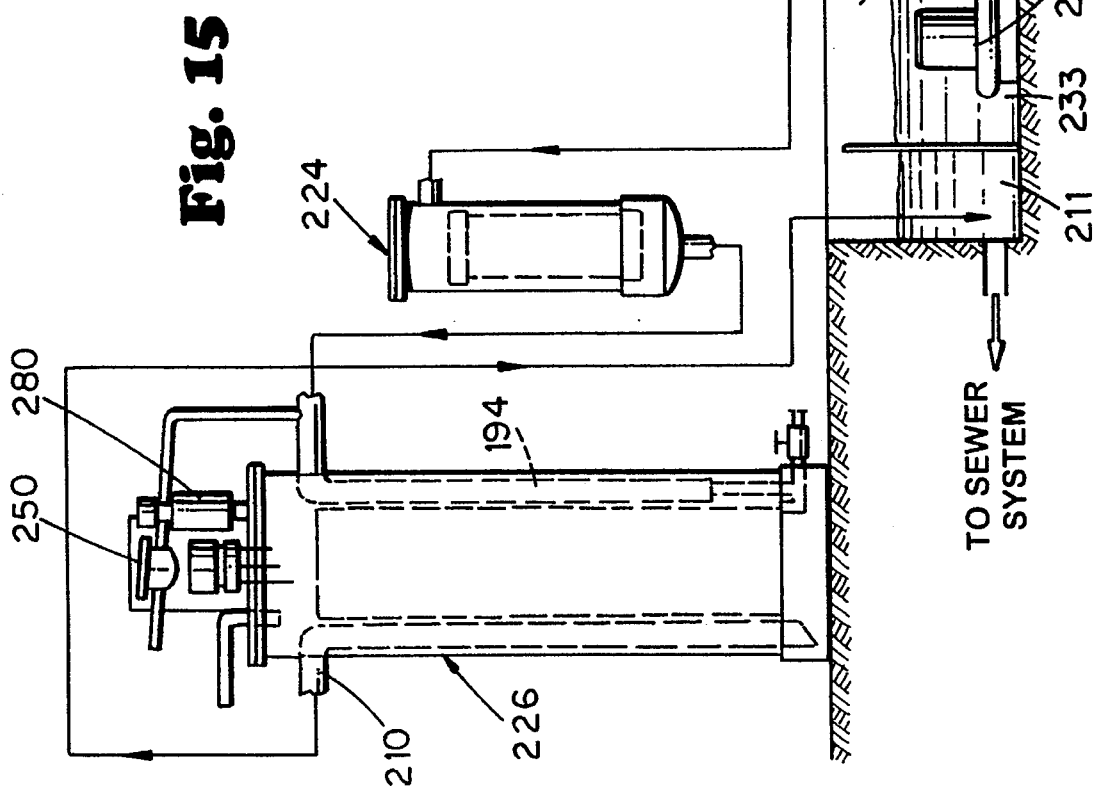
FIG. 15 is an elevation view of an alternate embodiment of the present invention.

Referring now to FIG. 15, an alternate embodiment of the present invention is depicted. In the event the operator does not need to dispose of substantial food particles (e.g., it is a fast food restaurant which uses disposable plates), it may not be necessary that a pump station 20 and primary food separation station 22 as discussed above be used. In those instances, the second food separation station 24 as discussed above with respect to FIG. 6 in conjunction with an oil and grease separation station 26 may be sufficient.

As shown in FIG. 15, separation station 224 is the sole food separation station and operates in the identical manner discussed above with respect to the food separation station 24. In the alternate embodiment, waste water enters from floor drains and other waste water streams in the kitchen or food preparation area into a sump tank 233. When the water reaches a predetermined level, pump 234 is activated, as discussed above and waste water is pumped into the top of separation station 224 as noted above with respect to FIG. 6. Separation station 224 includes the same components as separation station 24 and operates in the same manner. Effluent leaves the bottom of separation station 224 and enters an injection member 194 of an oil and grease separation station 226 identical to that discussed above with respect to member 94 of FIG. 6. The operation of oil and grease separation station 226 is identical to that discussed above with respect to oil and grease separation station 26 in the preferred embodiment, and would include an anti-siphoning mechanism 250 identical in operation to that described above with respect to anti-siphoning mechanism 150 of the preferred embodiment. The alternate embodiment also includes an air surge mechanism 280 identical to that described above with respect to mechanism 180 of the preferred embodiment. The oil and grease separation station 226 includes an oleophillic material identical to oleophillic material 100 of separation station 26 which permits the coalescing of the oil and grease at the top of the vertical housing and permits the remaining fluids to exit through exit conduit 210 into a second sump tank 211. At that point, the water may be introduced directly into the sewer system.

The present invention has been described in terms of particular embodiments. Obviously, modifications and alterations to these embodiments will be apparent to those skilled in the art in view of this disclosure. It is, therefore, intended that all such equivalent modifications and variations fall within the spirit and scope of the present invention as claimed.

What is claimed is:

1. An improved food, oil and grease accumulation system comprising:

(a) a pump station having a housing and a pump supported within said housing and adapted to receive a contaminated water stream and discharge said stream from said housing at a higher flow rate, said pump station further including baffle means for floating at the waterline within said housing and maintain food off of the interior surface of said housing;

(b) a food separation station having:
   at least one chamber for receiving said stream discharged from said pump station,
   a first conduit for connecting said housing to said one chamber,
   at least one removable filter supported within said chamber and adapted to remove food particles from said stream, and
   a discharge conduit for removing said stream following passage through said filter;

(c) an oil and grease separation station having:
   an elongated vertical housing,
   an injection member in fluid communication with said discharge conduit for introducing said stream into said vertical housing as discharged from said food separation station, said injection member being positioned within said vertical housing proximate the interior surface of said vertical housing and having a plurality of apertures along the length of said injection member to discharge said stream substantially uniformly along the length of said vertical housing,
   an oleophillic material supported within said vertical housing and having channels orientated at an acute angle to the longitudinal axis of said vertical housing so that said stream discharged from said injection member being permitted to pass through said oleophillic material substantially uniformly along the length of said material permitting oil and grease particles to contact said oleophillic material, coalesce and rise along said channels toward the top of said vertical housing, and
   a collection and discharge chamber at the bottom of said vertical housing for removing water having passed through said oleophillic material; and (d) means for periodically removing the oil and grease collected at the top of said vertical housing.

2. The improved accumulation system according to claim 1 wherein said food separation station further comprises means for deodorizing food particles remaining within said removable filter.

3. The improved accumulation system according to claim 1 wherein said system further comprises means for supporting and rotating said food separation station to facilitate the removal of said filter for cleaning.

4. The improved accumulation system according to claim 1 wherein said system further includes means for preventing the siphoning of said stream from said vertical housing back to said food separation station.

5. The improved accumulation system according to claim 1 wherein said pump station further includes means for periodically injecting water at the top of said housing to cleanse any food particles adhering to the interior surface of said pump housing.

6. An improved food, oil and grease accumulation system comprising:

(a) a pump for receiving a contaminated water stream and for discharging said stream at a higher flow rate;

(b) a food separation station having:
at least one chamber for receiving said contaminated stream discharged from said pump,
a first conduit for connecting said housing to said one chamber,
at least one removable filter supported within said chamber and adapted to remove food particles, and
a discharge conduit for removing said stream following passage through said filter;

(c) an oil and grease separation station having:
an elongated vertical housing,
an injection member in fluid communication with said discharge conduit for introducing said stream into said vertical housing from said discharge conduit of said food separation station, said injection member being positioned within said vertical housing proximate the interior surface of said vertical housing and having a plurality of apertures along the length of said injection member to discharge said stream substantially uniformly along the length of said vertical housing,
an oleophillic material supported within said vertical housing and having channels orientated at an acute angle to the longitudinal axis of said vertical housing so that said stream discharged from said injection member being permitted to pass through said oleophillic material substantially uniformly along the length of said material permitting oil and grease particles to contact said oleophillic material, coalesce and rise along said channels to the top of said vertical housing,
a collection and discharge outlet at the bottom of said vertical housing for removing water having passed through said oleophillic materials, and
means for preventing the siphoning of said contaminated stream from said vertical housing back to said food separation station; and (d) means for periodically removing the oil and grease collected at the top of said vertical housing.

7. The improved accumulation system according to claim 6 wherein said food separation station further comprises means for deodorizing food particles remaining within said removable filter.

8. The improved accumulation system according to claim 6 wherein said food separation system further comprises means for supporting and rotating said food separation station to facilitate the removal of said filter for cleaning.

9. An improved food, oil and grease accumulation system comprising:

(a) pump station having a housing and a pump supported within said housing and adapted to receive a contaminated water stream and discharge said stream from said housing at a higher flow rate, said pump station further including baffle means for floating at the waterline within said housing to maintain food off the interior surface of said housing;

(b) a food separation station having:
at least one chamber for receiving said stream discharge from said pump station,
a first conduit for connecting said housing to said one chamber,
at least one removable filter supported within said chamber and adapted to remove food from said stream,
a discharge conduit for removing said stream following passage through said filter, and
means for deodorizing food remaining within said removable filter;

(c) an oil and gas separation station having:
an elongated vertical housing,
an injection member in fluid communication with said discharge conduit for introducing said stream into said vertical housing as discharged from said food separation station, said injection member being positioned within said vertical housing proximate the interior surface of said vertical housing and having a plurality of apertures along the length of said injection member to discharge said stream substantially uniformly along the length of said vertical housing,
an oleophillic material supported within said vertical housing and having channels oriented at an acute angle to the longitudinal axis of said vertical housing so that said stream discharged from said injection member being permitted to pass through said oleophillic material substantially uniformly along the length of said material permitting oil and grease particles to contact said oleophillic material, coalesce and rise along said channels toward the top of said vertical housing, and
a discharge and collection chamber at the bottom of said vertical housing for removing water having passed through said oleophillic material;

(d) means for periodically removing oil and grease collected at the top of said vertical housing;

(e) means for supporting and rotating said food separation station to facilitate the removal of said filter for cleaning; and (f) means for preventing the siphoning of said stream from said vertical housing back to said food separation station.

10. An improved food, oil and grease accumulation system comprising:

(a) a pump for receiving a contaminated water stream and discharging said stream at a higher pump rate;

(b) a first food separation station having:
a chamber for receiving said contaminated stream discharged from said pump,
a removable filter supported within said chamber and adapted to remove food from said stream,
a first discharge conduit for removing said stream following passage through said filter, and
a conduit for connecting said pump to said chamber;

(c) a second food separation station having:
a chamber for receiving said stream discharged from said first discharge conduit,
a removable filter supported within said chamber of said second food separation station and adapted to remove food of a size smaller than the food removed by said first food separation station, and
a second discharge conduit for removing said stream following passage through said filter of said second food separation station; and (d) an oil and grease separation station having:
an elongated vertical housing,
an injection member for introducing said stream into said vertical housing from said second discharge conduit, said injection member being positioned within said vertical housing proximate the interior surface of said vertical housing,
an oleophillic material supported within said vertical housing and having channels orientated at an acute angle to the longitudinal axis of said vertical housing so that said stream discharged from said injection member is permitted to pass through said oleophillic material substantially uniformly along the length of said material permitting oil and grease particles to contact said oleophillic material, coalesce and rise along said channels to the top of said vertical housing, and
a discharge collection outlet at the bottom of said vertical housing for removing water having passed through said oleophillic material;
(e) means for periodically removing the oil and grease collected at the top of said vertical housing; and
(f) means for supporting and rotating said first food separation station to facilitate the removal of said filter for cleaning wherein said support and rotation means comprises a first plate and a second plate in spaced relationship, and means for minimizing frictional contact between said first and second plates.

11. The improved accumulation system according to claim 10 wherein said injection member includes a plurality of apertures along the length of said injection members to as to discharge said stream substantially uniformly along the length of said vertical housing.

12. The improved accumulation system according to claim 10 wherein said means for minimizing frictional contact comprises ball bearings.

13. The improved accumulation system according to claim 10 wherein said first and second food separation stations further comprise means for deodorizing food particles remaining within said removable filters.

14. The improved accumulation system according to claim 10 wherein said oil and grease separation station further includes means for preventing the siphoning of said contaminated stream from said vertical housing back to said second food separation station.

* * * * *